(12) United States Patent  (10) Patent No.: US 11,163,971 B2
Huang  (45) Date of Patent: Nov. 2, 2021

(54) OPTICAL FINGERPRINT SENSING APPARATUS AND ANTI-RI COMPENSATION METHOD THEREOF

(71) Applicant: Novatek Microelectronics Corp., Hsinchu (TW)

(72) Inventor: Min Huang, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/691,627

(22) Filed: Nov. 22, 2019

(65) Prior Publication Data

US 2021/0158006 A1   May 27, 2021

(51) Int. Cl.
*G06K 9/00* (2006.01)

(52) U.S. Cl.
CPC ....... *G06K 9/0004* (2013.01); *G06K 9/00067* (2013.01)

(58) Field of Classification Search
None
See application file for complete search history.

(56) References Cited

U.S. PATENT DOCUMENTS

2010/0002008 A1* 1/2010 Tsuzaki ................. G06F 3/0412
                                                      345/581
2020/0110919 A1* 4/2020 Qiu ...................... G06K 9/00013

* cited by examiner

*Primary Examiner* — Joseph R Haley
(74) *Attorney, Agent, or Firm* — JCIPRNET

(57) ABSTRACT

An optical fingerprint sensing apparatus and an anti-relative illumination (anti-RI) compensation method thereof are provided. The optical fingerprint sensing apparatus includes an optical fingerprint sensor module and a processing circuit. The optical fingerprint sensor module is configured to capture a fingerprint image frame. The processing circuit is coupled to the optical fingerprint sensor module to receive the fingerprint image frame. The processing circuit obtains an anti-RI gain value corresponding to a current pixel in the fingerprint image frame from a lookup table. The processing circuit compensates an original illumination of the current pixel using the anti-RI gain value to obtain a compensated illumination of the current pixel.

6 Claims, 4 Drawing Sheets

OPTICAL FINGERPRINT SENSING APPARATUS AND ANTI-RI COMPENSATION METHOD THEREOF

BACKGROUND

Field of the Invention

The invention relates to a fingerprint sensing apparatus and more particularly, to an optical fingerprint sensing apparatus and an anti-relative illumination (anti-RI) compensation method thereof.

Description of Related Art

In recent years, demands for fingerprint sensing have been gradually increased. In order to reduce a volume of an electronic device, a fingerprint sensing region may be disposed in a display region of a display panel. For example, an under-display fingerprint recognition technique is to dispose (attach) fingerprint sensors or a fingerprint sensor module beneath (on a back surface of) the display panel. When a finger touches the display panel, a fingerprint sensor may sense/capture a fingerprint image through the display panel. Due to limited transmittance capability of a capacitive sensor, the under-display fingerprint recognition technique adopts an optical imaging or optical sensing technique.

FIG. 1 is a schematic diagram illustrating a scenario where an optical fingerprint sensor module 30 performs fingerprint sensing. The optical fingerprint sensor module 30 may be disposed beneath (attached to) (a back surface of) a display panel 20. The display panel 20 may serve as a light source for fingerprint sensing. When a finger 10 touches the display panel, the light from the display panel 20 is irradiated to the finger 10 to generate reflected light. The reflected light passing through an optical lens 31 of the optical fingerprint sensor module 30 is focused (imaged) on an image sensor 32 of the optical fingerprint sensor module 30. Generally, various variation factors exist in the fingerprint sensing, such as a distance variation of a light path (e.g., a variation of a thickness z1 of the display panel 20 illustrated in FIG. 1, a variation of a distance z2 between the display panel 20 and the optical fingerprint sensor module 30 and a variation of a distance z3 between the optical lens 31 and the image sensor 32), an light absorptivity variation of a light-transparent material, a light uniformity variation of the display 20 and a process variation of a curvature of the optical lens 31. These variation factors lead to illumination abnormality (i.e., uneven illumination) to an image frame.

FIG. 2 is a schematic graph illustrating a relative illumination (RI) of an image frame of the optical fingerprint sensor module 30. In FIG. 2, the vertical axis represents an RI of the optical fingerprint sensor module 30, and the horizontal axis represents a distance with respect to a reference point in the image frame (e.g., a center point in the image frame). The RI may be defined as, in the image frame, a ratio of an illumination of a current pixel (target pixel) to an illumination of a reference pixel (e.g., a pixel of the center point in the image frame). According to the RI curve illustrated in FIG. 2, as a distance from the current pixel (target pixel) to the reference pixel (e.g., the center pixel) is increased, the RI corresponding to the current pixel (target pixel) is reduced. Because the illumination of the reference pixel is greater than illuminations of other pixels, a greyscale value of the reference pixel may likely be prematurely saturated.

It should be noted that the contents of the section of "Description of Related Art" is used for facilitating the understanding of the invention. A part of the contents (or all of the contents) disclosed in the section of "Description of Related Art" may not pertain to the conventional technology known to the persons with ordinary skilled in the art. The contents disclosed in the section of "Description of Related Art" do not represent that the contents have been known to the persons with ordinary skilled in the art prior to the filing of this invention application.

SUMMARY

The invention provides an optical fingerprint sensing apparatus and an anti-relative illumination (anti-RI) compensation method thereof capable of compensating an illumination variation of the optical fingerprint sensor module.

According to an embodiment of the invention, an optical fingerprint sensing apparatus including an optical fingerprint sensor module and a processing circuit is provided. The optical fingerprint sensor module is configured to capture a fingerprint image frame. The processing circuit is coupled to the optical fingerprint sensor module to receive the fingerprint image frame. The processing circuit is configured to obtain an anti-RI gain value corresponding to a current pixel in the fingerprint image frame from a lookup table and compensate an original illumination of the current pixel using the anti-RI gain value to obtain a compensated illumination of the current pixel.

According to an embodiment of the invention, an anti-RI compensation method including the following steps is provided. A fingerprint image frame is captured by an optical fingerprint sensor module. An anti-RI gain value corresponding to a current pixel in the fingerprint image frame is obtained from a lookup table by a processing circuit. An original illumination of the current pixel is compensated by the processing circuit using the anti-RI gain value to obtain a compensated illumination of the current pixel.

To sum up, the optical fingerprint sensor module of the embodiments of the invention can capture a fingerprint of a finger to obtain a fingerprint image frame. For each pixel in the fingerprint image frame, the processing circuit can compensate the original illumination of the pixel using the anti-RI gain value corresponding to the pixel. Thus, the optical fingerprint sensing apparatus can compensate the illumination variation of the optical fingerprint sensor module.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
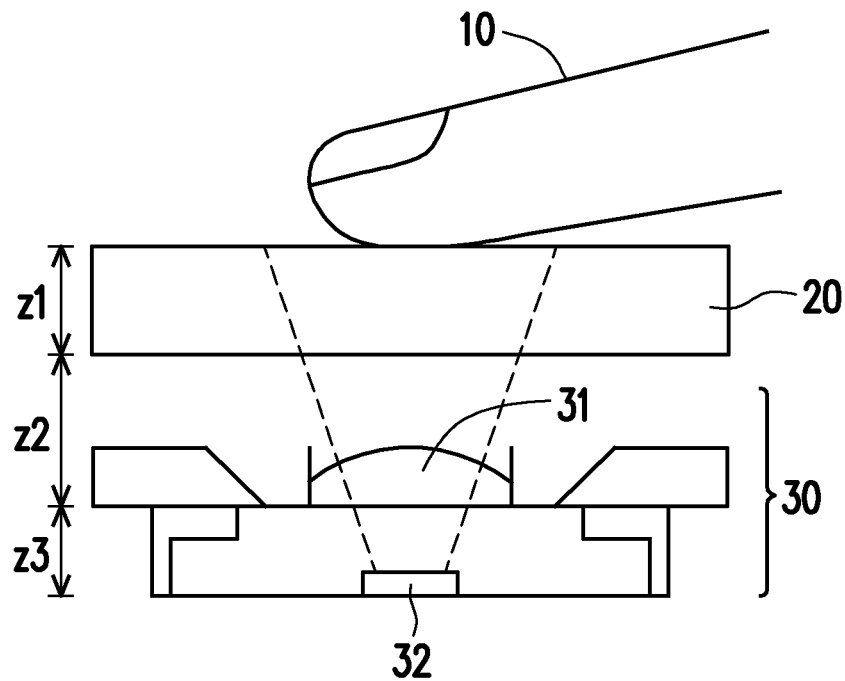
FIG. 1 is a schematic diagram illustrating a scenario where an optical fingerprint sensor module performs fingerprint sensing.
Figure 2:
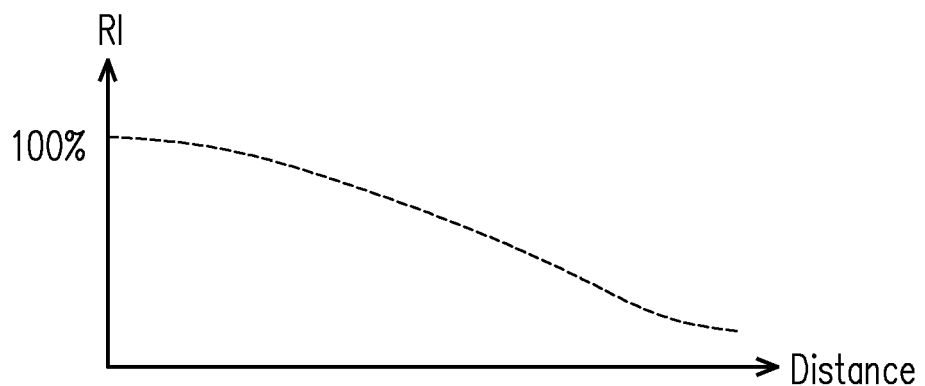
FIG. 2 is a schematic graph illustrating a relative illumination (RI) of an image frame of the optical fingerprint sensor module.

The term "couple (or connect)" throughout the specification (including the claims) of this application are used broadly and encompass direct and indirect connection or coupling means. For example, if the disclosure describes a first apparatus being coupled (or connected) to a second apparatus, then it should be interpreted that the first apparatus can be directly connected to the second apparatus, or the first apparatus can be indirectly connected to the second apparatus through other devices or by a certain coupling means. Terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Figure 3:
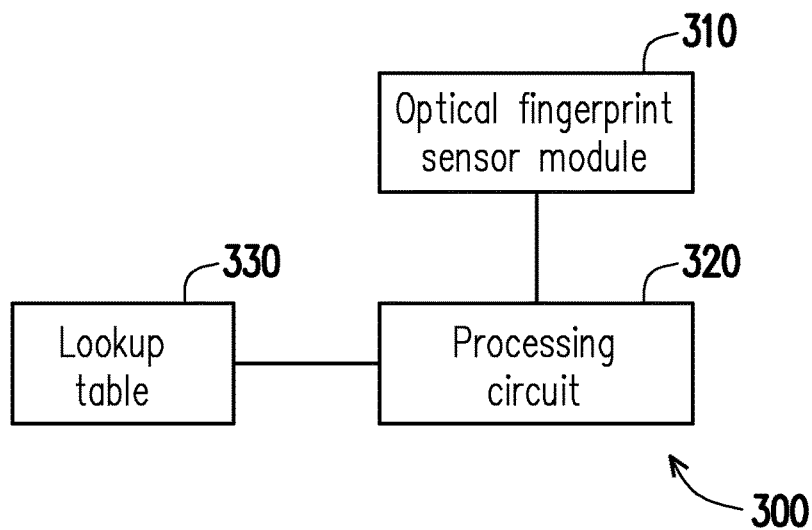
FIG. 3 is a schematic circuit block diagram illustrating an optical fingerprint sensing apparatus according to an embodiment of the invention.

FIG. 3 is a schematic circuit block diagram illustrating an optical fingerprint sensing apparatus 300 according to an embodiment of the invention. The optical fingerprint sensing apparatus 300 illustrated in FIG. 3 includes an optical fingerprint sensor module 310 and a processing circuit 320. The optical fingerprint sensor module 310 is configured to capture a fingerprint image frame. The implementation manner of the optical fingerprint sensor module 310 of the present embodiment may be determined based on a design requirement. For example, in some embodiments, the optical fingerprint sensor module 310 may be inferred with reference to the description related to the optical fingerprint sensor module 30 illustrated in FIG. 1.

Figure 4:
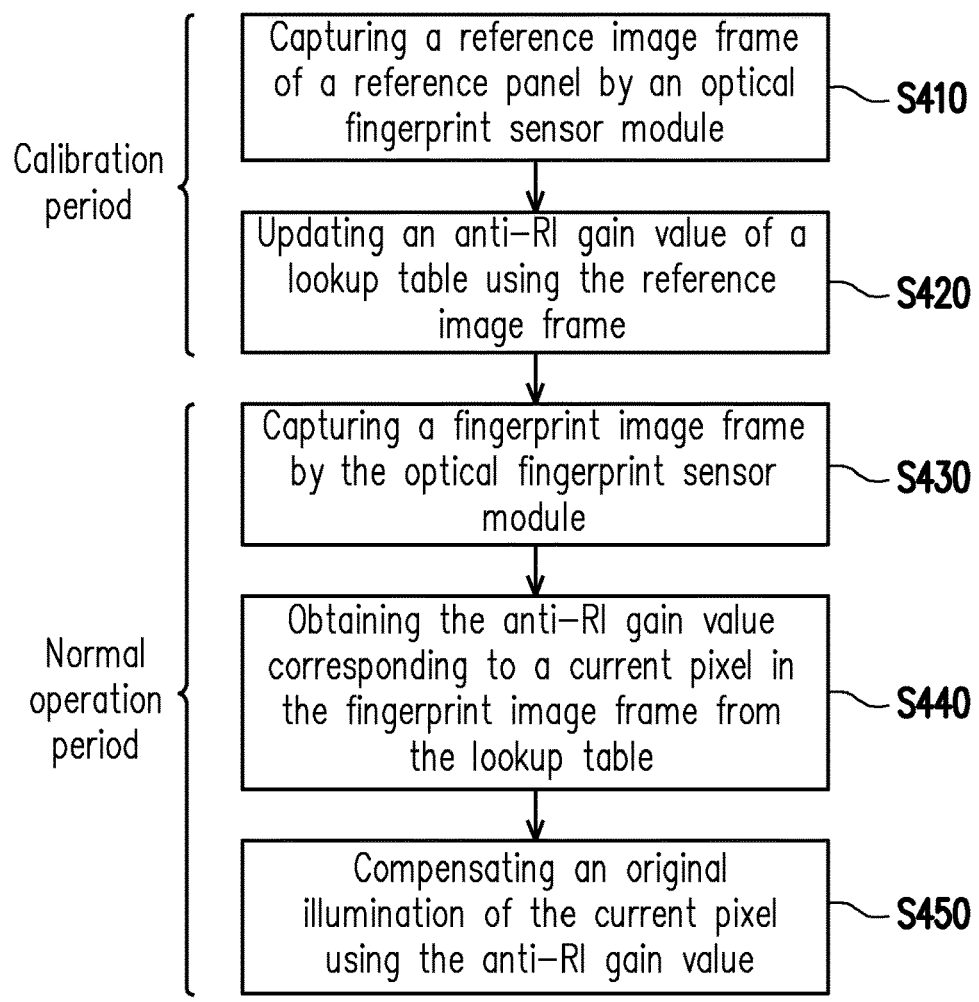
FIG. 4 is a flowchart illustrating an anti-relative illumination (anti-RI) compensation method of an optical fingerprint sensing apparatus according to an embodiment of the invention.

FIG. 4 is a flowchart illustrating an anti-relative illumination (anti-RI) compensation method of an optical fingerprint sensing apparatus according to an embodiment of the invention. Based on a design requirement, a calibration period illustrated in FIG. 4 may refer to a period in which products are under adjustment/test in production lines in a factory or may refer to an initial period that a user uses a display apparatus having the optical fingerprint sensing apparatus 300 for the first time. In other embodiments, the user may operate the display apparatus having the optical fingerprint sensing apparatus 300 at any time, so as to enter the calibration period as illustrated in FIG. 4.

Referring to FIG. 3 and FIG. 4, during the calibration period, the user may cover a reference plate (not shown) on a light path of the optical fingerprint sensor module 310. Taking FIG. 1 for example, the reference plate may substitute for the finger 10, i.e., the reference plate may be covered on the display panel 20. Based on a design requirement, the reference plate may be a light reflector, for example, a metal plate, a plane mirror or other light reflectors. After the reference plate is covered above the optical fingerprint sensor module 310, the optical fingerprint sensor module 310 may sense reflected light of the reference plate to capture the reference image frame of the reference plate (step S410).

The processing circuit 320 is coupled to the optical fingerprint sensor module 310 to receive the fingerprint image frame. In step S420, the processing circuit 320 may update an anti-RI gain value of a lookup table by using the reference image frame of step S410. For example, it is assumed that the reference image frame of step S410 includes at least one reference pixel and at least one target pixel. The reference pixel may be selected based on a design requirement. For example, the at least one reference pixel may be a pixel (or a plurality of pixels) located in a central region of the reference image frame of step S410. Generally speaking (but not limited to), the reference pixel may be a pixel (or a plurality of pixels) located in a highlight region of the reference image frame. In step S420, the processing circuit 320 may update the lookup table 330 according to an illumination difference between the reference pixels and the target pixels.

In some embodiments, the pixels in the reference image frame of step S410 have a one-to-one relationship with the anti-RI gain values in the lookup table 330. Namely, when the reference image frame (the fingerprint image frame) has n pixels, there are n anti-RI gain values in the lookup table 330. The processing circuit 320 may calculate a ratio of an illumination of the reference pixel and an illumination of the target pixel and serve the ratio as the anti-RI gain value of the target pixel. The processing circuit 320 may store (update) the anti-RI gain value of the target pixel in the lookup table 330 for retrieving it for use during a normal operation period.

In some other embodiments, the pixels in the reference image frame of step S410 have a multiple-to-one relationship with the anti-RI gain values in the lookup table 330. Namely, a plurality of pixels of the reference image frame (the fingerprint image frame) may commonly use (commonly correspond to) the same anti-RI gain value in the lookup table 330. For example, the reference image frame (the fingerprint image frame) may be divided into a plurality of regions, wherein different regions correspond to different anti-RI gain values in the lookup table 330, and the same region may commonly use (commonly correspond to) the same anti-RI gain value in the lookup table 330. A method of dividing the reference image frame (the fingerprint image frame) may be determined based on a design requirement.

Figure 5:
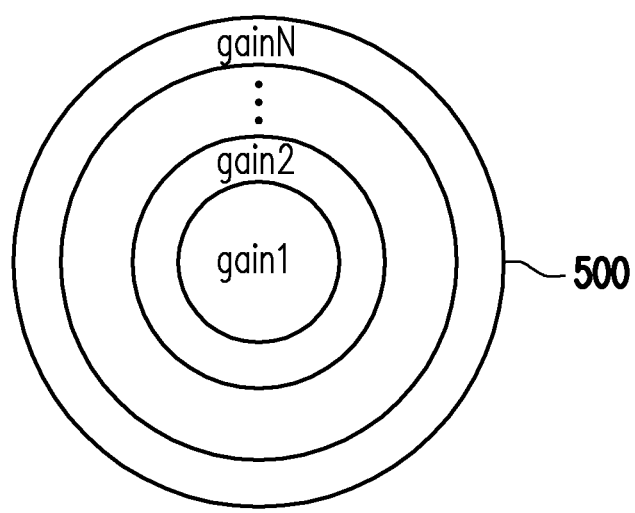
FIG. 5 is a schematic diagram of dividing an image frame into regions according to an embodiment of the invention.

FIG. 5 is a schematic diagram of dividing an image frame into regions according to an embodiment of the invention. It is assumed in the embodiment illustrated in FIG. 5 that the highlight region is located at the center point of a reference image frame 500. In the embodiment illustrated in FIG. 5, the reference image frame (the fingerprint image frame) 500 is divided into a plurality of regions as a plurality of concentric circles illustrated in FIG. 5. The processing circuit 320 may calculate an average value (a first average value) of illuminations of a plurality of reference pixels (or a reference pixel) in a reference region (e.g., at the center point). The processing circuit 320 may further calculate an average value (a second average value) of illuminations of all target pixels in the same target region. The processing circuit 320 may further calculate a ratio of the first average value to the second average value, for example, by dividing the first average value by the second average value. The ratio may serve as an anti-RI gain value commonly used by (commonly correspond to) all the target pixels in the target region. For example, the regions of the reference image frame (the fingerprint image frame) 500 respectively correspond to anti-RI gain values gain1, gain2, . . . and gainN, wherein gain1<gain2<gainN. The processing circuit 320 may store (update) the anti-RI gain values gain1 to gainN in the lookup table 330, such that the anti-RI gain values gain1 to gainN are retrieved and used during the normal operation period.

Figure 6:
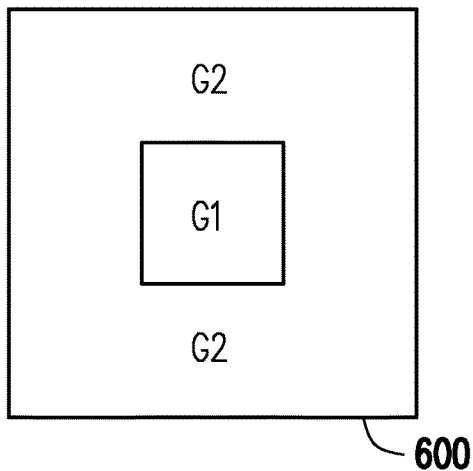
FIG. 6 is a schematic diagram of dividing an image frame into regions according to another embodiment of the invention.

FIG. 6 is a schematic diagram of dividing an image frame into regions according to another embodiment of the invention. It is also assumed in the embodiment illustrated in FIG. 6 that the highlight region is located at a center point of a reference image frame 600. In the embodiment illustrated in FIG. 6, the reference image frame (the fingerprint image frame) is divided into a plurality of regions. Similar to the description related to FIG. 5, the processing circuit 320 may calculate anti-RI gain values corresponding to the regions illustrated in FIG. 6. For example, the regions of the reference image frame (the fingerprint image frame) 600 respectively correspond to anti-RI gain values G1 and G2, wherein G1<G2. The processing circuit 320 may store (update) the anti-RI gain values G1 and G2 in the lookup table 330, such that the anti-RI gain values G1 and G2 are retrieved and used during the normal operation period.

Figure 7:
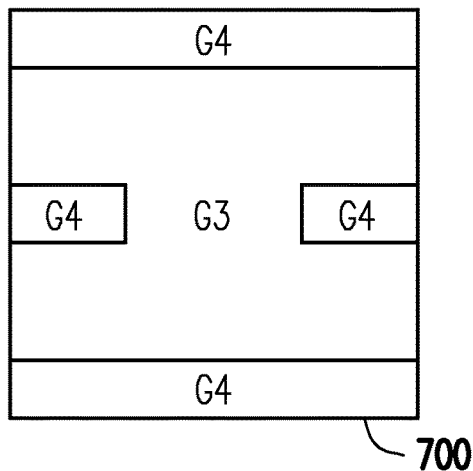
FIG. 7 is a schematic diagram of dividing an image frame into regions according to yet another embodiment of the invention.

FIG. 7 is a schematic diagram of dividing an image frame into regions according to yet another embodiment of the invention. It is also assumed in the embodiment illustrated in FIG. 7 that the highlight region is located at a center point of a reference image frame 700. In the embodiment illustrated in FIG. 7, the reference image frame (the fingerprint image frame) 700 is divided into a plurality of regions. Similar to the description related to FIG. 5, the processing circuit 320 may calculate anti-RI gain values corresponding to the regions illustrated in FIG. 7. For example, the regions of the reference image frame (the fingerprint image frame) 700 respectively correspond to anti-RI gain values G3 and G4, wherein G3<G4. The processing circuit 320 may store (update) the anti-RI gain values G3 and G4 in the lookup table 330, such that the anti-RI gain values G3 and G4 are retrieved and used during the normal operation period.

Figure 8:
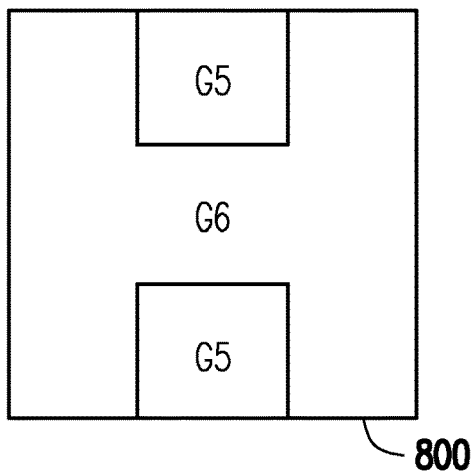
FIG. 8 is a schematic diagram of dividing an image frame into regions according to still another embodiment of the invention.

FIG. 8 is a schematic diagram of dividing an image frame into regions according to still another embodiment of the invention. It is assumed in the embodiment illustrated in FIG. 8 that the highlight regions are located at an upper edge and a lower edge of a reference image frame 800. In the embodiment illustrated in FIG. 8, the reference image frame (the fingerprint image frame) 800 is divided into a plurality of regions. Similar to the description related to FIG. 5, the processing circuit 320 may calculate anti-RI gain values corresponding to the regions illustrated in FIG. 8. For example, the regions of the reference image frame (the fingerprint image frame) 800 respectively correspond to anti-RI gain values G5 and G6, wherein G5<G6. The processing circuit 320 may store (update) the anti-RI gain values G5 and G6 in the lookup table 330, such that the anti-RI gain values G5 and G6 are retrieved and used during the normal operation period.

Referring to FIG. 3 and FIG. 4, during the normal operation period, when the finger is located above the optical fingerprint sensor module 310, the optical fingerprint sensor module 310 may capture the fingerprint image frame (step S430). The processing circuit 320 is coupled to the optical fingerprint sensor module 310 to receive the fingerprint image frame. The processing circuit 320 may obtain an anti-RI gain value corresponding to the current pixel in the fingerprint image frame from the lookup table 330 (step S440). The processing circuit 320 may compensate an original illumination of the current pixel using the anti-RI gain value of step S440 to obtain a compensated illumination of the current pixel (step S450). For example, the processing circuit 320 may multiply the original illumination of the current pixel by the anti-RI gain value to obtain the compensated illumination of the current pixel.

Based on the above, the optical fingerprint sensor module 310 of the embodiments of the invention may capture the fingerprint of the finger to obtain the fingerprint image frame. For each pixel in the fingerprint image frame, the processing circuit 320 may compensate the original illumination of the pixel using the anti-RI gain value corresponding to the pixel. Thus, the optical fingerprint sensing apparatus 300 may compensate the illumination variation of the optical fingerprint sensor module. According to different design requirements, the block of the processing circuit 320 may be implemented in a form of hardware, firmware, software (i.e., programs) or in a combination of many of the aforementioned three forms.

In terms of the hardware form, the block of the processing circuit 320 may be implemented in a logic circuit on an integrated circuit. The related function of the processing circuit 320 may be implemented in a form of hardware by utilizing hardware description languages (e.g., Verilog HDL or VHDL) or other suitable programming languages. For example, the related function of the processing circuit 320 may be implemented in one or more controllers, a microcontroller, a microprocessor, an application-specific integrated circuit (ASIC), a digital signal processor (DSP), a field programmable gate array (FPGA) and/or various logic blocks, modules and circuits in other processing units.

In terms of the software form and/or the firmware form, the related function of the processing circuit 320 may be implemented as programming codes. For example, the processing circuit 320 may be implemented by using general programming languages (e.g., C or C++) or other suitable programming languages. The programming codes may be recorded/stored in recording media, and the aforementioned recording media include, for example, a read only memory (ROM), a storage device and/or a random access memory (RAM). The programming codes may be accessed from the recording medium and executed by a computer, a central processing unit (CPU), a controller, a micro-controller or a microprocessor to accomplish the related functions. As for the recording medium, a "non-transitory computer readable medium", such as a tape, a disk, a card, a semiconductor memory or a programmable logic circuit, may be used. In addition, the programs may be provided to the computer (or the CPU) through any transmission medium (e.g., a communication network or radio waves). The communication network is, for example, the Internet, wired communication, wireless communication or other communication media.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical fingerprint sensing apparatus, comprising:
an optical fingerprint sensor module, configured to capture a fingerprint image frame; and
a processing circuit, coupled to the optical fingerprint sensor module to receive the fingerprint image frame, and configured to obtain an anti-relative illumination (anti-RI) gain value corresponding to a current pixel in the fingerprint image frame from a lookup table and compensate an original illumination of the current pixel using the anti-RI gain value to obtain a compensated illumination of the current pixel,
wherein the optical fingerprint sensor module is configured to capture a reference image frame of a reference plate during a calibration period, and the reference image frame comprises at least one reference pixel and at least one target pixel, wherein the at least one reference pixel is located in a central region of the reference image frame,
wherein the processing circuit is configured to calculate a ratio by dividing at least one first illumination of the at least one reference pixel by at least one second illumination of the at least one target pixel, and serve the ratio directly as the anti-RI gain value of the at least one target pixel, thereby updating the lookup table.

2. The optical fingerprint sensing apparatus according to claim 1, wherein the reference plate is a light reflector.

3. An optical fingerprint sensing apparatus, comprising:
an optical fingerprint sensor module, configured to capture a fingerprint image frame; and
a processing circuit, coupled to the optical fingerprint sensor module to receive the fingerprint image frame, and configured to obtain an anti-relative illumination (anti-RI) gain value corresponding to a current pixel in the fingerprint image frame from a lookup table and compensate an original illumination of the current pixel using the anti-RI gain value to obtain a compensated illumination of the current pixel,
wherein the optical fingerprint sensor module is configured to capture a reference image frame of a reference plate during a calibration period, and the reference image frame comprises at least one reference pixel and at least one target pixel, wherein the at least one reference pixel is located in a central region of the reference image frame,
wherein the processing circuit is configured to calculate a first average value of at least one first illumination of the at least one reference pixel, calculate a second average value of at least one second illumination of the at least one target pixel, calculate a ratio by dividing the first average value by the second average value and serve the ratio directly as the anti-RI gain value of the at least one target pixel, thereby updating the lookup table.

4. An anti-RI compensation method of an optical fingerprint sensing apparatus, comprising:
capturing, by an optical fingerprint sensor module, a fingerprint image frame;
obtaining, by a processing circuit, an anti-RI gain value corresponding to a current pixel in the fingerprint image frame from a lookup table;
compensating, by the processing circuit, an original illumination of the current pixel using the anti-RI gain value to obtain a compensated illumination of the current pixel;
capturing, by the optical fingerprint sensor module, a reference image frame of a reference plate during a calibration period, wherein the reference image frame comprises at least one reference pixel and at least one target pixel, and the at least one reference pixel is located in a central region of the reference image frame;
calculating, by the processing circuit, a ratio by dividing at least one first illumination of the at least one reference pixel by at least one second illumination of the at least one target pixel; and
serving, by the processing circuit, the ratio as the anti-RI gain value of the at least one target pixel directly, thereby updating the lookup table.

5. The anti-RI compensation method according to claim 4, wherein the reference plate is a light reflector.

6. An anti-RI compensation method of an optical fingerprint sensing apparatus, comprising:
capturing, by an optical fingerprint sensor module, a fingerprint image frame;
obtaining, by a processing circuit, an anti-RI gain value corresponding to a current pixel in the fingerprint image frame from a lookup table;
compensating, by the processing circuit, an original illumination of the current pixel using the anti-RI gain value to obtain a compensated illumination of the current pixel;
capturing, by the optical fingerprint sensor module, a reference image frame of a reference plate during a calibration period, wherein the reference image frame comprises at least one reference pixel and at least one target pixel, and the at least one reference pixel is located in a central region of the reference image frame;
calculating, by the processing circuit, a first average value of at least one first illumination of the at least one reference pixel;
calculating, by the processing circuit, a second average value of at least one second illumination of the at least one target pixel;
calculating, by the processing circuit, a ratio by dividing the first average value by the second average value; and
serving, by the processing circuit, the ratio as the anti-RI gain value of the at least one target pixel directly, thereby updating the lookup table.

* * * * *